Nov. 9, 1948.  C. A. NERACHER ET AL  2,453,156
SERVOMOTOR
Filed Nov. 13, 1939  4 Sheets-Sheet 1
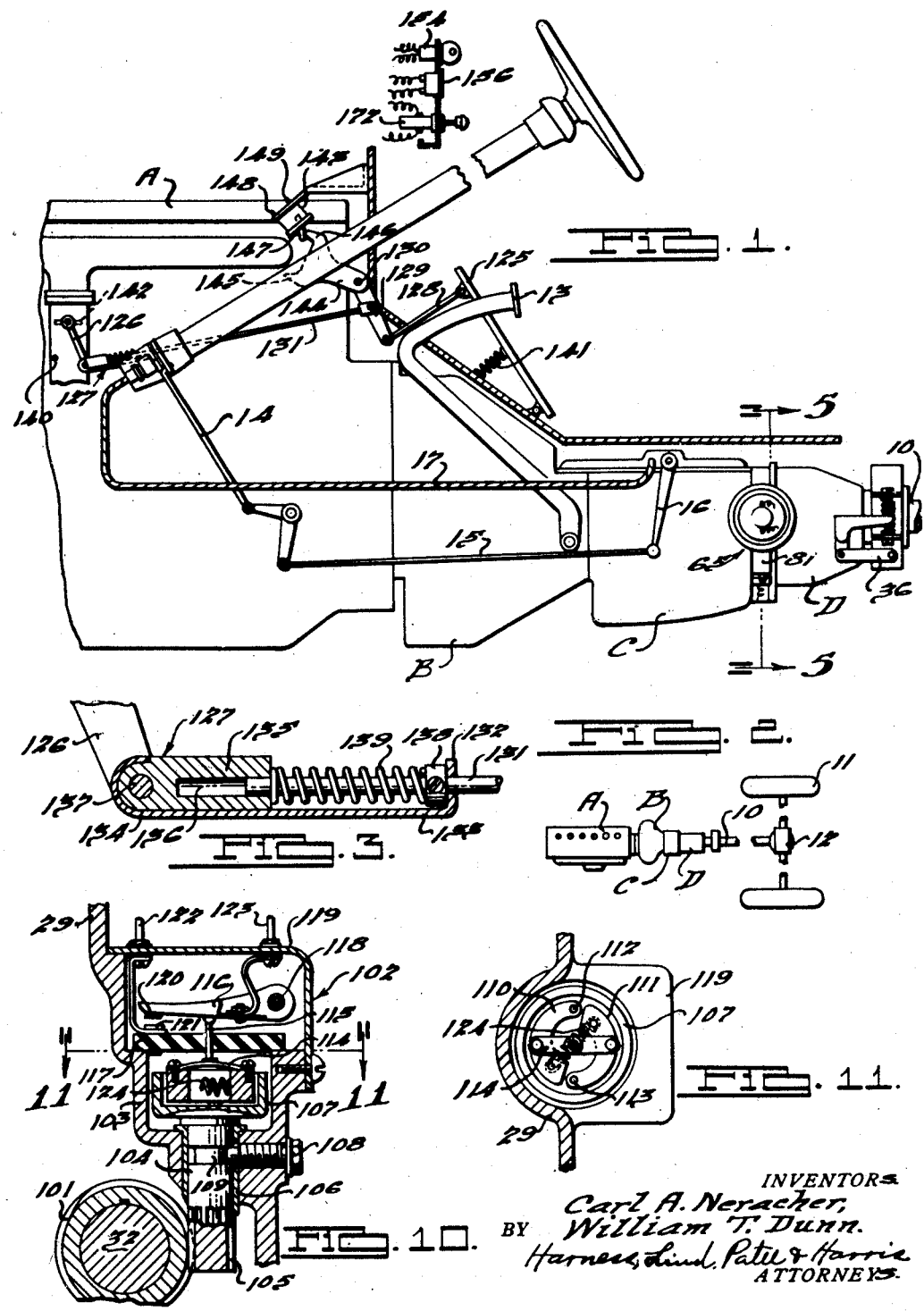
INVENTORS
Carl A. Neracher,
William T. Dunn.
BY Harness, Dickey, Pierce & Harris
ATTORNEYS

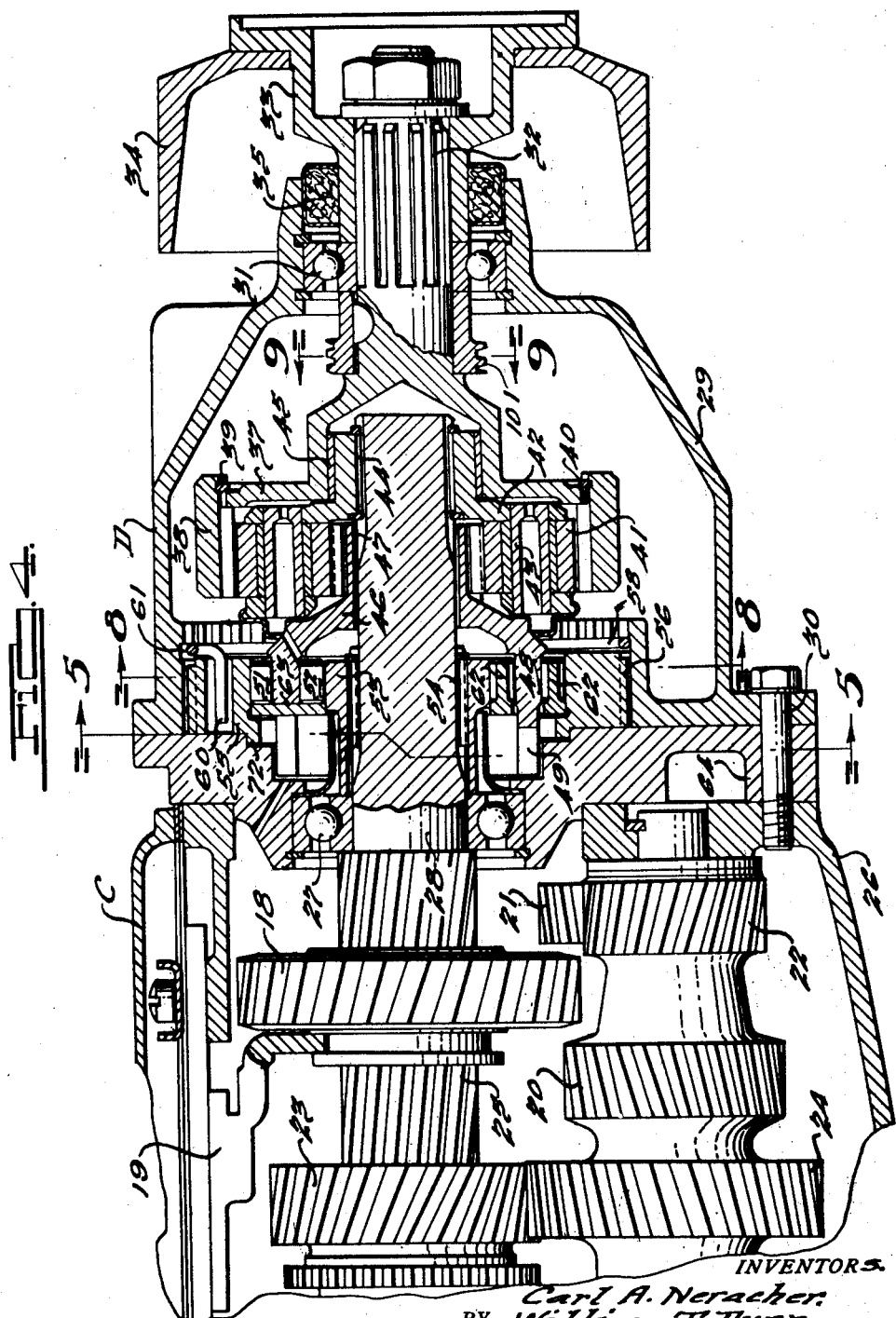

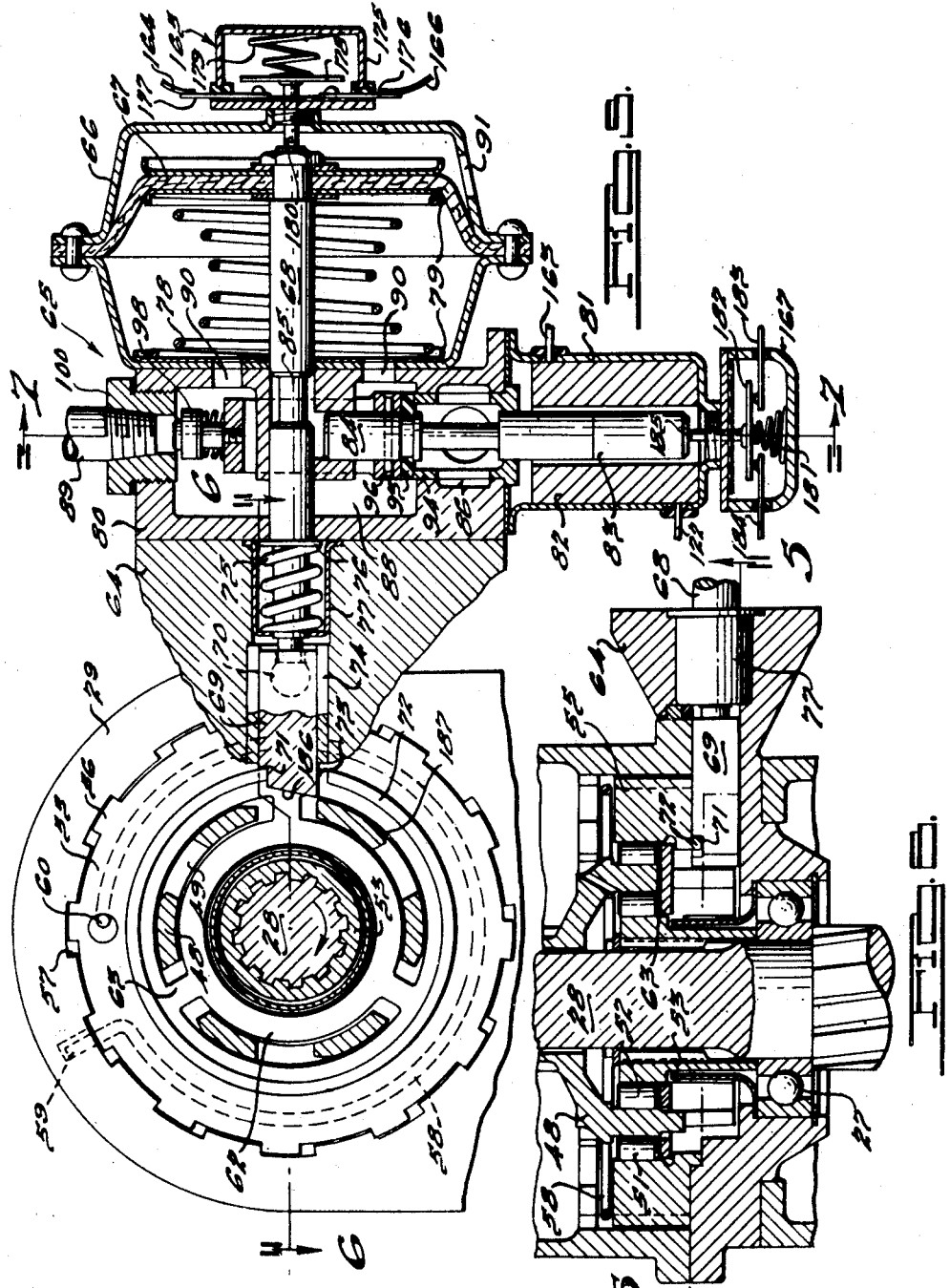

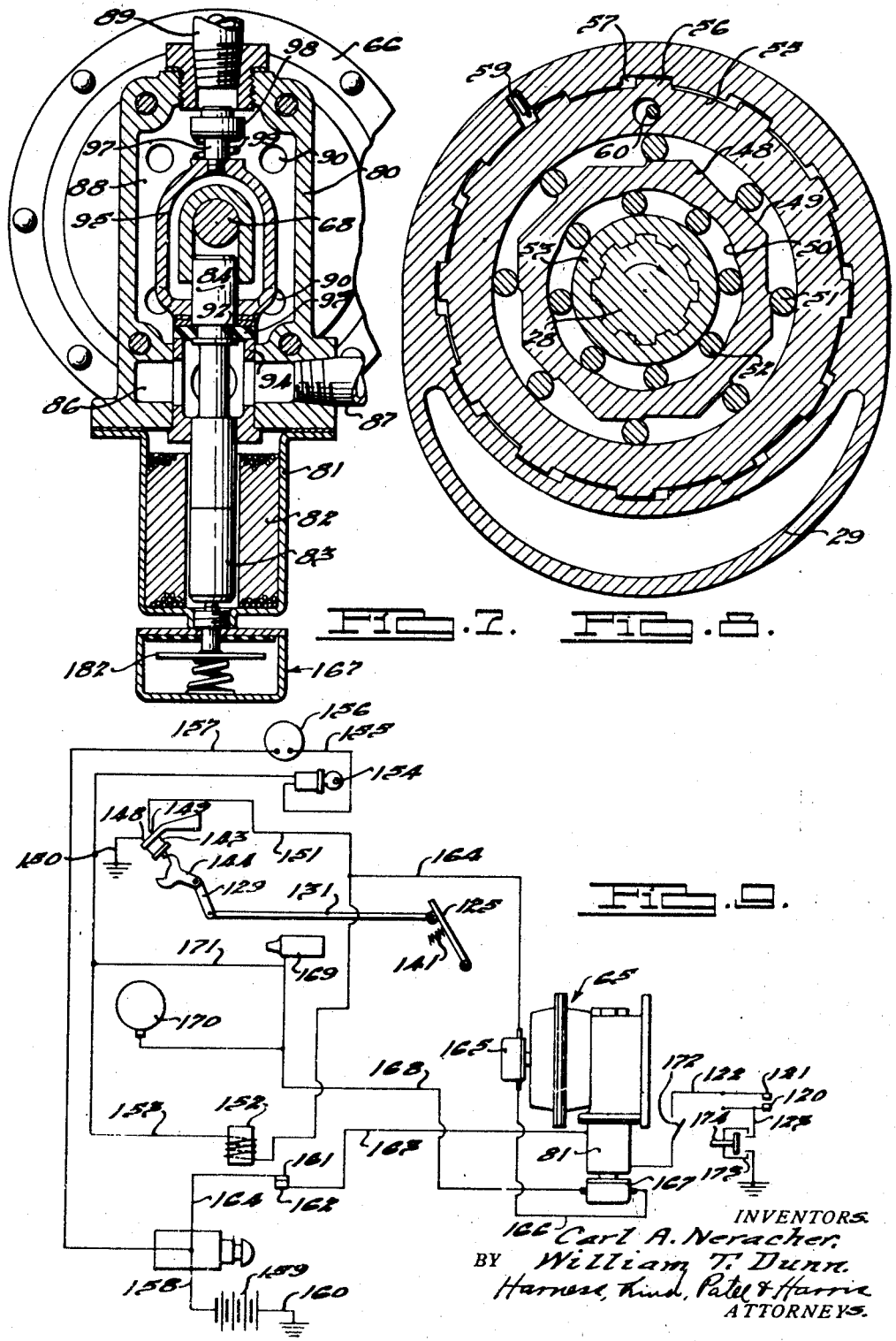

Patented Nov. 9, 1948

2,453,156

UNITED STATES PATENT OFFICE 2,453,156

SERVOMOTOR

Carl A. Neracher and William T. Dunn, Detroit, Mich., assignors to Chrysler Corporation, Highland Park, Mich., a corporation of Delaware Application November 13, 1939, Serial No. 304,060

8 Claims. (Cl. 200—83)

This invention relates to power transmissions and refers more particularly to improvements in speed ratio changing mechanism especially adapted for use in driving motor vehicles.

The principal object of the invention is to provide an improved speed ratio changing mechanism for driving the propeller shaft of a motor vehicle at a speed different from, and preferably faster than, the driving shaft thereof.

Additional objects of our invention are to provide a mechanism of the aforesaid character having improved characteristics of long life, quietness of operation, automatic response to vehicle travel, and low manufacturing cost.

More specifically, another object of the invention is to provide an overdrive transmission mechanism which incorporates an overrunning clutch action between the driving and driven shafts during normal driving for synchronizing the two shafts preparatory to establishing of the faster drive, but which does not permit continuous overrunning during normal drive as is the case with conventional devices of this type, and which requires no lockout means for reverse drive.

Another object is to provide an improved overdrive mechanism wherein the planet pinions do not rotate during direct driving and the annulus gear is driven at direct drive speed rather than at overdrive speed. Such an arrangement results in much quieter operation due to elimination of "gear sing" in direct drive, and promotes economy by cutting down oil churn in the overdrive casing.

Still another object is to provide an improved means for clutching the reaction element of the overdrive planetary gear train to the casing whereby the same clutching means may be used for initially establishing the overdrive, for quickly dis-establishing the overdrive by "kickdown" action of the accelerator pedal or other control means and for re-establishing the overdrive after kickdown.

A further object is to provide an improved means for controlling the operation of the overdrive unit wherein engine vacuum may be used under the control of a solenoid which also acts to lock the clutching means in overdrive position, thus avoiding the possibility of unintentional disengagement of the clutch due to a low vaccum condition in the engine intake manifold. In connection with this improved control means we have provided a system of switches for locking the overdrive out of operation completely at the will of the driver, and for preventing operation of the overdrive when driving in low or intermediate gear of the regular transmission.

A still further feature resides in the novel and improved control means for the overdrive wherein the pawl for clutching the planetary reaction element to the casing for establishment of the fast drive is urged to its engaged position by vacuum and to its disengaged or kickdown position by a spring; the engagement and disengagement of said pawl being controlled by a solenoid which also acts to lock the pawl in its engaged position upon establishment of the fast drive.

A still further feature is the provision of a novel system of switches for grounding of the engine ignition for kickdown, the said switches being so arranged that ignition grounding may occur by reason of accelerator pedal overtravel only when the overdrive mechanism is in operation.

An additional and extremely important feature of our invention resides in the provision of a double over-running clutch device which eliminates free-wheeling of the vehicle in all speeds in addition to eliminating the necessity for locking out the overdrive mechanism during reverse driving as is the case with overdrives of the prior art. In connection with the double overrunning device, we have provided improved blocker mechanism which positively prevents engagement of the planetary reaction element locking pawl except during coast of the vehicle, the blocking element being moved out of blocking position by action of the planetary unit itself during coast of the vehicle.

In our copending divisional application Serial No. 433,544, filed March 6, 1942, we have included claims directed to our speed ratio change mechanism and system of control therefor. In the subject application we have included claims directed to our novel servo-motor embracing our novel compact arrangement of controlling and controlled parts comprising a unit motor structure, the principles of which are best illustrated in Figs. 5 and 7.

Additional objects and advantages of our invention will be more apparent from the following detailed description of a preferred embodiment thereof, reference being had to the accompanying drawings in which:

Fig. 1 is a partial side elevational view of a motor vehicle equipped with the improved overdrive mechanism showing the essential control apparatus.

Fig. 2 is a diagrammatic representation of the vehicle drive mechanism.

Fig. 3 is an enlarged sectional view of the lost motion connection between the throttle valve control lever and the accelerator pedal linkage.

Fig. 4 is a sectional view in side elevation of the improved overdrive mechanism, part of the regular vehicle transmission also being shown.

Fig. 5 is a sectional view taken approximately along the line 5—5 of Figs. 1, 4 and 6.

Fig. 6 is a sectional view taken on the line 6—6 of Fig. 5.

Fig. 7 is a sectional view taken along the line 7—7 of Fig. 5.

Fig. 8 is a sectional view taken along the line 8—8 of Fig. 4.

Fig. 9 is a circuit diagram of the electrical connections.

Fig. 10 is a sectional view of the governor mechanism for controlling the cut-in of the overdrive mechanism.

Fig. 11 is a sectional view along the line 11—11 of Fig. 10.

Referring to the drawings in which like reference numerals designate corresponding parts in the following description, we have illustrated (Fig. 2) our overdriving mechanism D interposed between a speed ratio transmission C of the manually controlled type and a driven shaft 10, the latter extending rearwardly to drive the rear wheels 11 through the usual differential mechanism 12. The transmission C is connected to the engine A through the usual clutch B operated by a pedal 13, and is adapted for selective control by the driver by means of the links 14, 15, the lever 16 and the Bowden cable 17, the links and cable being actuated by a control lever (not shown) mounted at the top of the steering column.

The transmission C may be of general conventional construction and operation thus we have shown only a part of it in Fig. 4 wherein 18 designates a low speed and reverse gear adapted to be shifted by the usual selector control member forwardly (to the left as viewed in Fig. 4) into mesh with the low speed countershaft gear 20, or rearwardly into mesh with the reverse idler gear 21. The latter is in constant mesh with the countershaft gear 22. The intermediate speed gear 23 journaled on the mainshaft 25 is in constant mesh with the countershaft gear 24 and may be clutched to the shaft 25 for driving the same at an intermediate speed by means not shown, it being understood that by proper manipulation of the transmission controls, the mechanism may be adapted to selectively produce reverse drive and different speed ratio drives forwardly.

In Fig. 4, the shaft 25 is supported at the rear end of the transmission casing 26 by an anti-friction ball bearing 27 and has a reduced rearwardly extending portion 28 with which the overdrive mechanism is operatively associated. The overdrive is housed in a casing 29 secured to the casing 26 by fasteners 30 and carries an anti-friction bearing 31 at the rear end thereof in which is supported a tailshaft 32. The latter has a hub member 33 splined thereto which carries the drum 34 of a transmission shaft brake referred to generally by the numeral 36 in Fig. 1. A fiber seal 35 forms a grease retainer for the end of the housing.

The tailshaft 32 has an enlarged bell-shaped forward portion 37 which carries the annulus gear 38 of the planetary gearset, the driving connection therebetween being provided by the teeth 39. A snap ring 40 retains gear 38 in correct position. In mesh with the annulus gear 38 is a plurality of planet gears 41 rotatably mounted on a carrier 42 by means of axles 43. The carrier is splined at 44 on the end of the shaft portion 28 and is separated from the part 37 by a suitable bushing 45.

The planet gears 41 also mesh with a sun gear 46 journaled on the shaft 28 at 47 just forwardly of the carrier 42. The sun gear has a forwardly extending control sleeve 48 provided with a plurality of slots 49, the purpose of which will be presently made clear. The sleeve 48 is provided with an external cam 49 and an internal cam 50 which respectively form drive elements of outer and inner overrunning devices having sets of rollers designated 51 and 52 respectively. The other drive element of the inner overrunning device consists of a cylindrical member 53 splined on the shaft 28 at 54. The other drive element of the outer overrunning clutch consists of a member 55 provided with a cylindrical inner surface and a toothed outer surface; the teeth 56 of which are adapted to be received into slots 57 milled into the inner surface of the casing 29. It will be noted (Figs. 5 and 8) that the slots are longer than the teeth 56 the clearance thereby provided permitting the member 55 a slight degree of rotational movement about the axis of the assembly. A spring 58 disposed in a slot 61 cut in the casing 29 and fixed against movement relative to the casing and to the member 55 at 59 and 60 respectively acts to urge the member 55 to the limit of its rotational movement in the direction of forward rotation of the shaft 28, as shown in Fig. 8.

The overrunning rollers 51 and 52 are carried by a common cage or carrier 62 having spokes 63 (see Fig. 5) which extend through the slots 49, three of said slots being cut deeper, as shown in Fig. 4, to accommodate the same.

The cage 62 maintains the rollers 51, 52 in a definite relation with respect to each other and with respect to the cams 49 and 50. From Fig. 8 it may be seen that the rollers 51 are advanced circumferentially in the direction of rotation of the shaft 28 relatively to the rollers 52 and the cams 49 and 50 are so related to the rollers that the rollers 51 are in their neutral position when the rollers 52 are locked in driving position. Conversely, movement of the cage 63 to lock the rollers 51 in driving position will move the rollers 52 into their neutral non-driving position.

From the description so far, it may be seen that forward (clockwise) rotation of the shaft 28 will also rotate the planet carrier 42, the annulus 38 being held stationary due to the resistance of the rear drive wheels 11 to which the annulus is directly connected. This will cause the sun gear 46 to be driven forwardly at a greater speed than that of shaft 28, which in turn will cause the sun gear control sleeve 48 to drivingly engage the member 53 through lock-up of the rollers 52 between the cam 50 and the outer cylindrical surface of the member 53. The entire planetary gearset will then rotate as a unit and drive the tailshaft 32 at the speed of the shaft 28, the sleeve 48 rotating freely relatively to the reaction member 55 through overrun of the rollers 51. Under such conditions the positions of the various parts are as shown in Fig. 8 and the vehicle is driving in "direct" or conventional gear. If the driver removes his foot from the accelerator pedal permitting the vehicle to coast, the annulus 38 will become the driving element of the planetary set and the direction of rotation of the planet gears 41 will be reversed thus causing the sun gear 46 to rotate backwardly (counterclockwise) and disengage from driving relationship with the member 53 thereby unlocking rollers 52 which may then roll freely and locking the rollers 51 between the cam 49 and the member 55. The latter then becomes the reaction taking element for the planetary set and the shaft 28 is driven forwardly at a reduced speed relatively to shaft 32. It is therefore apparent that free-wheeling cannot occur when the car is in conventional gear.

When the transmission C is set for reverse drive, shaft 28 rotates backwardly (counterclockwise) and the resistance on the annulus 38 at the start causes the sun gear 46 to be rotated rearwardly thereby locking to the member 55. The annulus 38 will then be driven backwardly driving the tailshaft 32 backwardly at a speed greater than that of the shaft 28. In other words, the drive in reverse is an overdrive, the effective ratio of which may be adjusted as desired by suitably proportioning the gears 21 and 22.

Upon deceleration in reverse, the annulus 38 will reverse the rotation of the planet pinions 41 and cause the sun gear 46 to unlock from the member 55 and lock up to the member 53 thereby driving the shaft 28 at the speed of the tailshaft 32.

During the above described operations, the reaction taking element 55 will rotate backwardly against the spring 58 whenever lock-up occurs between the members 46 and 55 thereby cushioning the shock occasioned by the reversal of the sun gear.

It is to be noted that the aforesaid arrangement provides a decided advantage when rocking the vehicle between forward and reverse, as is frequently done when the car is mired, because a short period of free-wheeling occurs during reversal of the sun gear and a fast shift may be obtained without use of the clutch pedal.

Means will now be described for holding the sun gear 46 against rotation during forward driving of the vehicle to furnish reaction for the planetary gearset to provide a forward overdriving ratio and for controlling the holding means to provide desirable and convenient control thereof.

Referring now to Figs. 5, 6 and 7, in conjunction with Figs. 1 and 4, it may be seen that the end wall 64 which separates the casing 26 from the casing 29 has mounted on the left side thereof a motor unit referred to generally as 65. This motor unit comprises a vacuum cylinder 66 having a differential pressure operated member herein illustrated in the form of a diaphragm 67 therein operatively associated with thrust-transmitting means in the form of a rod 68 which extends transversely inwardly of the wall 64 and which has a pawl 69 secured to the end thereof by means of a ball connection 70.

The pawl 69 is provided with a notch 71 which is adapted to engage the forwardly extending ledge 72 of the reaction taking member 55 when the latter is in its forward position, this being the position shown in Figs. 5, 6 and 8 and the one to which the member 55 is urged by the spring 58. The member 55 thus acts as a blocker member for preventing engagement of the pawl 69 during the time that the sun gear 46 is locked to the shaft 28 by the rollers 52. The ledge 72 is provided with a milled slot 73 which, upon rotation of the member 55 rearwardly to take up the clearance between the slots 57 and the teeth 56, will permit the pawl to pass through and engage in the slots 49 of the sun gear control sleeve 48. Before this action can take place, however, the outer overrunning rollers 51 cooperate with the sun control sleeve to effect a simultaneous unblocking of the pawl and a synchronization of the sun control sleeve with the pawl to thereby permit a smooth and easy engagement. This action will be presently more clearly described in detail.

A pair of guide plates 74 flank the pawl 69 where it slides in the part 64 and the rod 68 is preferably provided with a coil spring 75 which is adapted to be compressed between the abutment 76 and the bottom of the cup 77 upon movement of the rod to engage the pawl. The vacuum actuated diaphragm 67 is also provided with a coil spring 78, suitably retained in place by cups 79, which tends to urge the diaphragm 67 and the rod 68 outwardly. The spring 78 is also adapted to be compressed when vacuum is admitted to the cylinder 66 to move the rod 68 inwardly.

Between the cylinder 66 and the part 64 a valve housing 80 is provided which has an electrical solenoid 81 attached to the bottom side thereof. The solenoid is provided with the usual coil 82 and plunger 83, the latter having an upwardly extending portion 84 which is adapted upon energization of the solenoid to engage the reduced portion 85 of the rod 68 to thereby lock the latter against unintentional outward movement under the influence of springs 75 and 78 due to a low vacuum condition which might exist in the cylinder 66 because of high torque demand or the like.

The valve housing 80 is provided with a chamber 86 which is supplied with vacuum through a pipe 87 connected to any suitable source such as the intake manifold of the vehicle engine. The main valve chamber 88 is open to the atmosphere through a pipe 89 during the time the solenoid is de-energized and the vehicle is driving in conventional gear.

The vacuum cylinder 66 is in communication with the main valve chamber 88 at all times through the openings 90 (of which four are provided) on one side of the piston diaphragm 67, the chamber on the other side of the diaphragm being open to the atmosphere at 91.

The solenoid plunger rod portion 84 has a reduced portion at 92 to which is secured a fiber valve member 93, the latter being adapted to seat on top of the annulus member 94 when the solenoid is de-energized thereby cutting off the vacuum or low pressure chamber 85 from communication with the main chamber 88 and the motor 66. The rod 84 is further provided with a stirrup-like member 95 fastened thereto by a pin 96. This member 95 carries an upright pin 97 on which is disposed a valve member 98 of fiber or the like which is urged upwardly by a coil spring 99.

The valve member 98 is adapted to cut off the entrance of atmospheric air into the valve chamber 88 upon energization of the solenoid 81 which action, of course, causes the plunger 83 to move upwardly lifting the valve 93 off its seat and admitting vacuum into the chamber 88 whereupon the air present in cylinder 66 on the left side of the diaphragm 67 is exhausted and the atmospheric pressure on the other side of the diaphragm causes the diaphragm to move inwardly toward the left to engage the pawl 69 in one of the slots 49 provided that the pawl is unblocked. The extreme upper end of the rod portion 84 engages the rod 68 just forwardly of the reduced portion 85 upon upward movement of the solenoid plunger. Inward movement of the rod 68 to engage the pawl will bring the reduced portion 85 adjacent the end of rod portion 84 whereupon the plunger 83 will move upwardly an additional amount to engage the rod portion 84 in the notch 85, thus locking the rod 68 against movement in the outward direction under the influence of the coil springs 75 and 78, which action might occur under conditions of low vacuum, such as when the vehicle is ascending a hill at low speed. The valve member 98 seats against the opening in the plug 100 and cuts off the atmosphere during the first part of the movement of plunger 83, the second part of said movement being accommodated by yielding of the spring 99.

Novel means is provided for controlling the energization of the solenoid 81 to cause the pawl 69 to be engaged under the proper conditions of vehicle operation and for returning the drive to conventional gear by disengagement of the pawl under all conditions of vehicle operation as desired by the driver.

In Fig. 4 a worm 101 is shown keyed to the tailshaft 32. This worm drives the vehicle speedometer (not shown) and in addition drives a governor mechanism for controlling the speed at which the solenoid 81 is energized for engaging the overdrive mechanism. The governor, referred to in Fig. 10 by the numeral 102, is mounted on the far side of the transmission casing 29 by means of a boss 103 and includes a shaft 104 having a worm gear 105 formed thereon for engagement with the worm 101. The shaft turns in a bushing 106 and has an enlarged cup-shaped upper portion 107. A setscrew 108 engages a groove 109 cut in the shaft for retaining the same in correct position. A pair of centrifugally actuated weights 110, 111 are pivoted in the cup 107 at 112, 113 respectively and are normally urged toward one another by a coil spring 124, an upwardly bowed flexible element 114 being attached to each of said weights as shown in Figs. 10 and 11. The element 114 has an upwardly extending post 115 attached thereto which extends upwardly through an insulating strip 117 into contact with a switch arm 116. The latter is pivoted at 118 to a cover 119 and has a contact 120 at one end which is adapted to engage a second contact 121 carried by the insulating strip 117 upon rotation of the shaft 104 at a speed sufficient to cause the weights 110, 111 to move outwardly away from each other appreciably. The contact 121 is connected to one side of the solenoid 81 (Fig. 9) by a wire 122 and the switch arm 116 is connected by a wire 123 to ground.

The spring 124 may be of any desired strength to give the cut-in characteristics desired for the overdrive. It has been found preferable to provide a spring of such strength that the contact 120 will engage the contact 121 to close the solenoid circuit at a vehicle speed of approximately 20 miles per hour at which time the driver may effect a shift to overdrive ratio by momentarily releasing the accelerator pedal which will reverse the torque through the transmission and unblock the pawl 69 as will be more clearly explained later on herein.

Once the pawl 69 has been engaged by action of the vacuum motor 66, it will remain engaged so long as the solenoid 81 is energized, which, as aforesaid, occurs at approximately 20 miles per hour. We have, however, provided means under the direct control of the driver for de-energizing the solenoid and effecting a quick shift back to direct drive at speeds greater than 20 miles per hour. This means is entirely separate from the governor mechanism and is controlled by overtravel of the regular vehicle accelerator pedal. The mechanism for securing this function is preferably arranged so that the accelerator pedal may be depressed to overtravel the engine throttle when fully open to thereby effect a deenergization of the solenoid and a momentary interruption of the engine torque to permit withdrawal of the pawl 69 from engagement with the sun gear 46. This arrangement is termed a "kickdown" control, and is preferably associated with the accelerator pedal since the driver ordinarily has his foot on this pedal and naturally depresses the pedal when increased power or speed is desired. The kickdown control is preferably used to secure increased torque when a quick increase in vehicle speed is desired such as when passing another car on a hill.

Referring to Figs. 1 and 9, it may be seen that the accelerator pedal 125 is connected to the throttle control member 126 to a lost motion mechanism generally referred to at 127 and which is shown in detail in Fig. 3. The accelerator pedal 125 is operatively connected by means of a link 128 with a lever 129 pivoted on the vehicle at 130. The lever 129 is in turn connected through the throttle valve control lever 126 by means of a rod 131 which is adapted to slide through an opening in the ear 132 of a bracket 133, this bracket having a forward portion 134 secured to a guide block 135 provided with a rearwardly open bore 136 and having pivotal connection at 137 with the throttle valve control lever 126. Rod 131 has fixed thereto a collar 138 forwardly adjacent the ear 132, a preloaded spring 139 surrounding the rod and acting between the block 135 and the collar 138 so that normally this spring serves as a connection between the rod 131 and block 135. The spring 139 functions as an overtravel spring and permits rod 131, lever 129 and pedal 125 to have a certain amount of overtravel after the throttle valve control lever 126 has engaged the stop 140 provided on the carburetor device as shown in Fig. 1. During overtravel of the accelerator pedal 125, spring 139 advises the driver that he is manipulating the accelerator pedal for actuation of the kickdown mechanism by reason of the extra resistance in addition to the regular accelerator pedal return spring 141 afforded by this compression of spring 139 which occurs when the collar 138 moves toward the block 135. In other words, when the accelerator pedal is manipulated for kickdown, extra resistance is encountered by reason of compressing spring 139 during operation of the Fig. 3 mechanism which accommodates overtravel of the accelerator pedal beyond its wide open throttle position. The forward end of rod 131 is slidably disposed in the bore 136, the bracket 134 limiting the operating tendency of the rod 131 and block 135 under the action of spring 139.

When the accelerator pedal 125 is depressed to open the throttle valve which is indicated at 142 in Fig. 1, link 128 operates to swing the lever 129 forwardly about the pivot 130, rod 131 thrusting block 135 forwardly with the relative movement therebetween so as to swing lever 126 forwardly and, as the accelerator pedal is depressed to the end of its range of throttle opening movement, the lever 126 will engage the stop 140. The accelerator pedal 125 is then adapted to have a further range of movement which overtravels the throttle valve, while maintaining the latter in its wide open throttle position, and in order to accommodate this overtravelling movement, the mechanism illustrated in Fig. 3 comes into action so that during said overtravel of rod 131, said rod will slide into the bore 136 and compress spring 139 with the forwardly moving block 135 or the throttle operating lever 126. Upon release of the accelerator pedal 125, spring 139, assisted by spring 141, operates to restore the parts to their normal closed position illustrated in Fig. 1. During this return movement of the parts, rod 131 and its associated parts, including accelerator pedal 125, move relative to block 135 and lever 126 until the collar 138 engages the ear 132 of the bracket 134 and thereafter spring 141 will move rod 131 along with block 135 and lever 126 without lost motion until the throttle valve 142 is restored to closed position and the accelerator pedal 125 is correspondingly positioned as in Fig. 1.

The aforesaid overtravelling movement of accelerator pedal 125 is adapted to effect energization of the solenoid 81 through operation of a switch 143. A switch operating lever 144 is fixed to the aforesaid lever 129 and is adapted to move therewith, this lever 144 having a pair of switch operating fingers 145 and 146 alternately engageable with the swinging operating element 147 of switch 143 which is preferably of the well-known snap-over type and provided with terminals 148 and 149. Terminal 148 is connected by a wire 150 which is grounded on the vehicle frame (Fig. 9) and terminal 149 is connected by a wire 151 to one side of a relay 152, the latter being in turn connected by a wire 153 to one side of the vehicle ignition switch 154.

In the fully released (throttle closed) position of the accelerator pedal 125 as is shown in Fig. 1, the finger 146 has operated the switch element 147 so that the switch is open and when the accelerator pedal 125 is depressed to the limit of its aforesaid throttle opening movement, the finger 145 has been swung upwardly about the lever support 130 and into engagement with the forward face of switch element 147. When the accelerator pedal is depressed for the aforesaid overtravelling range of movement, the finger 145 then swings the switch element 147 in a counterclockwise direction to cause this element to have the well-known snap-over action in closing the switch 143. When the accelerator pedal is again partially released to its wide open throttle position, finger 146 does not immediately engage switch element 147 for restoring the switch to its open position, this finger 146 preferably engaging the switch element when the pedal nears the end of its movement to fully released position such that the last portion of the releasing movement of the pedal is utilized for causing finger 146 to effect the snap-over switch opening movement of the element 147 in restoring the parts to their Fig. 1 position.

Thus it may be seen that the switch 143 when closed will effect energization of relay 152, one side of said relay being connected to ground through wire 151 and switch 143, and the other side of said relay being connected through wire 153, ignition switch 154, wire 155, vehicle ammeter 156, wire 157 and wire 158 to one side of the vehicle battery 159 which is in turn grounded through wire 160. The contacts 161, 162 of the relay 152 are normally closed thus connecting one side of the solenoid 81 to the battery 159 through the wires 163 and 164. It may thus be seen that closing of the switch 143 will open the contacts 161, 162 thus de-energizing the solenoid 81. In addition, the switch 143 will effect a momentary grounding of the vehicle ignition for securing the torque reversal necessary to unload the pawl 69 to thereby permit the springs 75 and 78 to pull the pawl out of engagement with the sun gear control sleeve 48. It may be seen from Fig. 9 that the wire 164 connects one side of the switch 143 with an ignition interrupter control switch 165 which is connected in series through wire 166 with a second ignition interrupter control switch 167, the latter switch being connected through a wire 168 with the ignition coil 169 and the distributor 170. A jumper wire 171 connects the coil 169 and distributor 170 with the wire 153 which is connected through the ignition switch and ammeter to one side of the vehicle battery 159.

The diagram of Fig. 9 also shows a switch 172 which is adapted to be mounted on the instrument panel of the vehicle as indicated in Fig. 1 for manual operation by the driver. The switch 172 is ordinarily closed but may be opened by the driver to cut out the overdrive mechanism if desired. An additional switch 173 is indicated in Fig. 9 which is adapted for operation by the high gear shift rail (not shown) of the manually shiftable transmission mechanism C. The switch 173 comprises a housing containing a pair of contacts which are adapted to be connected by the member 174 which is in turn adapted to be engaged by the shift rail upon shifting of the vehicle transmission C into high or direct drive. The switch 173 may be omitted from this circuit without in any way effecting the operation of the overdrive mechanism, the use of such switch being optional in cases where it is desired to prevent shift of the transmission into overdrive ratio until after the vehicle has been shifted into direct drive ratio in the manually shiftable transmission mechanism C.

Referring to Fig. 5 it may be seen that the switch 165 includes a housing 175 which encases a pair of relatively fixed contacts 176, 177 which are connected to the wires 166, 164, respectively, and a movable contact member 178 urged by a spring 179 into switch closing contact with the fixed contacts 176, 177. The movable contact member 178 is provided with an actuating pin or plunger 180 which has a lost-motion operating relationship with rod 68 such that the pin 180 is adapted to be engaged by the outer end of the rod 68 when the parts are in the position shown in Fig. 5, thus maintaining the switch 165 in open position to break the circuit between the wires 164 and 166.

The switch 167 is generally similar in construction to switch 165 except that the spring 181 thereof urges the plunger member 182 out of contact with the contacts 183, 184, the said plunger having an actuating pin 185 which is adapted to be engaged by the lower end of the solenoid plunger 83 to close the switch 167 when the parts are in their Fig. 5 position.

It may thus be seen that when the vehicle is being driven in direct or conventional gear, the switch 165 is open and the switch 167 is closed. Under such conditions, if the accelerator pedal 125 should be fully depressed to the limit of its overtravel position, grounding of the ignition could not take place due to the interruption in the ignition grounding circuit at the switch 165. Upon shifting of the mechanism into overdrive speed ratio, upward movement of the solenoid plunger 83 opens the switch 167 and the subsequent inward movement of the pawl actuating rod 68 permits the switch 165 to close. Under these conditions, upon depression of the accelerator pedal to the limit of its overtravel position which will of course effect closing of the switch 143 and deenergization of the solenoid 81 under operation of the relay 152, return of the solenoid plunger 83 to the Fig. 5 position will close switch 167. Switch 165 being also closed, this will effect the grounding of the ignition through wires 150, switch 143, wires 151, 164, switch 165, wire 166, switch 167 and wire 168. At the instant the ignition is grounded, a reversal of torque through the transmission will occur which will unload the pawl 69 permitting the springs 75 and 78 to thrust the diaphragm 67 and rod 68 outwardly disengaging the pawl from the slot 49. The rod 68 will thus engage the actuating member 180 of switch 165 after rod 68 and diaphragm 67 have moved outwardly sufficiently to take up the lost-motion between rod 68 and pin 180 and thus open the switch against the action of the biasing spring 179 thereby interrupting the ignition grounding circuit and restoring the ignition.

The kickdown operation just described takes place in an instant and the momentary interruption of the ignition circuit is barely noticeable to the occupants of the vehicle. As soon as the ignition circuit is restored by the opening of the switch 165, the motor drives under wide open throttle conditions in direct drive until the accelerator pedal is partially or fully released. It is not necessary for the driver to hold the accelerator pedal 125 fully depressed to the full extent of its overtravel in order to maintain the vehicle in kickdown because the solenoid 81 will remain deenergized until the pedal 125 has substantially returned to its idle position under the influence of the spring 141. This is necessary because of the construction of the switch control lever 144 which is explained above, it being necessary that the accelerator pedal 125 be substantially returned to its idle position before the finger 145 will contact the element 147 of the snap-over switch 143.

In the operation of the overdrive mechanism as a whole, let it be assumed that the switch 173 is included in the overdrive control circuit and that the vehicle is at rest with the engine running. The manually operable change speed mechanism C may be manipulated and the vehicle accelerated through the gears therein until direct drive through the transmission mechanism C has been obtained. During this period a speed greater than that necessary to effect closing of the governor switch contacts 120 and 121 may be obtained but energization of the solenoid 81 will not occur until direct drive has been obtained whereupon the switch 173 will be closed by engagement of the high gear rail of the transmission C with the element 174 of the switch. After a speed not in excess of approximately 20 miles per hour has been reached in high or direct drive, the contacts 120 and 121 of the governor controlled switch will close thus effecting energization of the solenoid 81 which will cause the plunger 83 thereof to thrust upwardly until the upper end portion 84 engages the rod 68 just inwardly of the depressed portion 85 thereof. A spring 181 will open the switch 167 at this time. The upward movement of the solenoid plunger 83 will unseat the valve element 93 thereby admitting vacuum from the intake manifold of the vehicle engine which is present in chamber 86 into the main valve chamber 88. At the same time the valve element 98 will be seated against the opening in the part 100 to cut off the admission of atmosphere into the valve chamber 188. The air in front of the diaphragm 67 of the motor 66 will thus be exhausted and the diaphragm will tend to move inwardly toward the shaft 28 but is prevented from doing so by the engagement of the blocker ledge 72 with the notch 71 of the pawl 69.

The driver may then secure a shift into overdrive ratio by momentarily releasing the accelerator pedal 125 which will cause the sun gear 26 to disengage from the rollers 52 and rotate rearwardly into driving engagement with the rollers 51 to thereby pick up the element 55 and rotate it rearwardly against the spring 58 to take up the clearance between the teeth 56 and slots 57. This backward movement of element 55 will unblock the pawl 69 thereby permitting the pawl to be thrust inwardly by the diaphragm 67 and rod 68 into engagement with one of the slots 49. It should be noted that at this particular instant the sun gear control sleeve 48 is stationary because of the reverse rotation of the planet gears 41 thereby permitting the pawl 69 to engage the slots 49 smoothly and silently. If it should happen that the sleeve 48 is in such position that the pawl 69 cannot engage one of the slots thereof, the engagement will occur instantly while depressing the accelerator pedal to continue driving of the vehicle. As may be seen from Fig. 5 the pawl 69 is inclined on its forward face at 186 and the sleeve 48 is chamfered at 187 adjacent each of the slots 49 to facilitate engagement of the pawl 69 should said pawl fail to engage while the sun gear is stationary.

Inward movement of the diaphragm 67 and rod 68 will of course permit the spring 179 to close the switch 165. The driver may then depress the accelerator pedal and the car will be driven forwardly in overdrive ratio.

The car will continue to be driven in overdrive ratio so long as the accelerator pedal 125 is not depressed to the limit of its overtravelling range of movement and the speed of the governor mechanism 102 which in the particular embodiment being described is preferably set at approximately 20 miles per hour. If the speed of the vehicle is allowed to fall substantially below 20 miles per hour, the weights 110 and 111 of the governor mechanism will be moved toward each other by the spring 124 thereby lifting the movable switch element 116 and operating the contacts 120 and 121. The solenoid 81 will thus be deenergized and the plunger thereof will return to the Fig. 5 position to thereby unlock the rod 68, unseat the valve member 98, seat the valve member 93 and close the switch 167. Air from the atmosphere will then enter valve chamber 88 through pipe 89 and flow into cylinder 66 through the openings 99. The springs 75 and 78 will then tend to move the diaphragm 67, rod 68 and pawl 69 toward the right of Fig. 5 which action will take place as soon as the frictional load upon the pawl occasioned by the pressure of the sides of the slots 49 is sufficiently low to permit the springs 75 and 78 to pull the pawl out of engagement with the slots 49. The outward movement of the rod 68 will of course open the switch 165 as aforesaid. In order to effect shift back into overdrive, the car must be accelerated to a speed greater than 20 miles per hour and the accelerator pedal released momentarily to permit the pawl to be reengaged as above described.

It is desired to point out that while vacuum means has been described as the preferred prime mover means for operating the overdrive pawl 69, other means may be employed such as a hydraulic cylinder or an electrical solenoid. Various parts of the mechanism shown and described herein may be changed or omitted without materially altering the operation of the device. For example, the solenoid locking function of the plunger rod portion 84 is not absolutely necessary for the successful operation of the overdrive nor is it absolutely necessary to have the switches 172 and 173 in the control circuit. Other changes and modifications will readily be apparent to those skilled in the art and we do not wish to limit our invention in its broader aspects to any of the parts, combinations and arrangements such as are shown and described for illustrative purposes, the scope of the invention being defined in the claims appended hereto.

We claim:

1. A prime mover unit adapted for operating a transmission shift member comprising, a vacuum cylinder having a pressure responsive member therein adapted for connection to said shift member; a control valve operably associated with said cylinder; a source of vacuum connected with said valve; a shiftable valve element in said valve; a solenoid having a plunger connected to said shiftable valve element; said solenoid plunger being adapted to shift said valve element in response to energization of said solenoid thereby to admit vacuum to said cylinder for shifting said shift member and to have a further range of movement for engaging said shift member thereby to hold it against reverse shift.

2. In a servo-motor having a pressure responsive member adapted to be moved in one direction by fluid pressure and in the opposite direction by spring pressure, an operating member connected with said pressure responsive member for movement thereby; electromagnetic means carried by said motor and including an armature operable to releasably hold said operating member in the position to which it is adapted to be moved by fluid pressure movement of said pressure responsive member whereby said operating member is retained in the aforesaid position independently of said fluid pressure; pressure fluid controlling valving means for said pressure responsive member; and a stirrup carried by said armature and straddling said operating member for mounting said valving means.

3. In a servo-motor, a reciprocable pressure responsive member; an operating rod connected with said pressure responsive member for operation thereby; a spring for urging said pressure responsive member and rod to one position; means including a valve for supplying vacuum from a suitable source to said motor for moving said pressure responsive member and rod to a second position; a solenoid for controlling said valve; circuit controlling switch means carried by said servomotor; means including the disposition of said switch means for causing the same to be operated to circuit closing position upon operation of said valve to vent said motor and means operable in response to movement of said pressure responsive member and rod to said one position for operating said switch means to circuit opening position; and latch means controlled by said solenoid and operable upon movement of said pressure responsive member and rod to said second position for retaining said rod in said second position independently of said vacuum supply.

4. As an article of manufacture, a thrust-developing differential pressure motor unit comprising, an assembly of component casing structures defining a housing structure for the motor unit, thrust-transmitting means mounted for reciprocatory movement within said housing structure and having a terminal portion projecting from said housing structure for delivering thrust from said motor unit, a differential pressure operated member disposed within said housing structure, means providing an operable connection between said member and said thrust-transmitting means whereby to effect movement of this means in one of its said directions of reciprocatory movement in response to differential pressure movement of said member, a spring within said housing structure biasing said member in opposition to its said differential pressure movement whereby to effect return movement of said thrust-transmitting means in the other of its said directions of reciprocatory movement, an electromagnet comprising a coil disposed within said housing structure and a plunger armature operably associated with said coil, said plunger armature having a rod portion extending coaxially therefrom, and means carried by said thrust-transmitting means for engagement with an end of said rod portion and so constructed and arranged as to thereby hold said member in its differential pressure operated position against the biasing influence of said spring and independently of the operation of differential pressure on said member.

5. As an article of manufacture, a thrust-developing differential pressure motor unit comprising, an assembly of component casing structures defining a housing structure for the motor unit, thrust-transmitting means mounted for reciprocatory movement within said housing structure and having a terminal portion projecting from one end of said housing structure for delivering thrust from said motor unit, a differential pressure operated member disposed within said housing structure, means providing an operable connection between said member and said thrust-transmitting means whereby to effect movement of this means in one of its said directions of reciprocatory movement in response to differential pressure movement of said member, a spring within said housing structure biasing said member in opposition to its said differential pressure movement whereby to effect return movement of said thrust-transmitting means in the other of its said directions of reciprocatory movement, electromagnetically controlled holding means disposed within said housing structure and operable when said member is in its differential pressure operated position to hold said member against its said spring-biased return movement independently of the operation of differential pressure on said member, an electrical switch carried by said motor unit adjacent the opposite end of said housing structure from that aforesaid, said switch comprising a contact member movable between two circuit-controlling positions and having means biasing said contact member to one of these two positions, switch operating means for moving said contact member from its said spring-biased position to the other of its said two positions in response to movement of said thrust-transmitting means in one of its said directions of reciprocatory movement, said switch operating means comprising a switch operating plunger mounted within said housing structure for reciprocatory movement coaxially with said thrust-transmitting means and having a lost-motion operating relationship with said thrust-transmitting means such that said biasing means will maintain said contact member in its said biased position during a portion of the last mentioned movement of said thrust-transmitting means.

6. As an article of manufacture, a thrust-developing servo-motor unit comprising, a casing structure, reciprocatory means comprising a member mounted for differential pressure movement within said casing structure from a first position to a second position thereof and a rod operably connected to said member and having a thrust-transmitting end portion for utilizing thrust developed by the servo-motor unit, a spring biasing said member for movement to its said first position, means carried by said casing structure and operable to releasably hold said member in its said second position against the bias of said spring and independently of the action of differential pressure on said member, a circuit controlling switch carried by the servo-motor unit and adapted for operation to effect closed and open positions of said switch, means biasing said switch to one of its said positions, and means for controlling said switch in response to operation of said reciprocatory means comprising a switch operating plunger having a lost-motion operating relationship with said reciprocatory means and being so constructed and arranged in relationship with said switch biasing means such that when said member is in one of its said positions then said biasing means serves to maintain said switch in one of its said positions and such that, when said member moves from its said one position toward the other of its said positions, said switch operating plunger will transmit thrust from said reciprocatory means to said switch thereby to effect operation of said switch to the other of its said positions after said member has completed a predetermined portion of its last said movement as accommodated by said lost-motion operating relationship.

7. As an article of manufacture, a thrust-developing servo-motor unit comprising, a casing structure, reciprocatory means comprising a member mounted for differential pressure movement within said casing structure from a first position to a second position thereof and a rod operably connected to said member and having a thrust-transmitting end portion for utilizing thrust developed by the servo-motor unit, a spring biasing said member for movement to its said first position, means carried by said casing structure and operable to releasably hold said member in its said second position against the bias of said spring and independently of the action of differential pressure on said member, a circuit controlling switch carried by the servo-motor unit and adapted for operation to effect closed and open positions of said switch, means biasing said switch to one of its said positions, and means for controlling said switch in response to operation of said reciprocatory means comprising a switch operating plunger having a lost-motion operating relationship with said reciprocatory means and being so constructed and arranged in relationship with said switch biasing means such that when said member is in one of its said positions then said biasing means serves to maintain said switch in one of its said positions and such that, when said member moves from its said one position toward the other of its said positions, said switch operating plunger will transmit thrust from said reciprocatory means to said switch thereby to effect operation of said switch to the other of its said positions after said member has completed a predetermined portion of its last said movement as accommodated by said lost-motion operating relationship, said casing structure having an opening through which said rod projects thereby to dispose said thrust-transmitting end portion to one side of said differential pressure operated member exteriorly of said casing structure, and means for mounting said switch operating plunger for movement at the other side of said member and coaxially with said differential pressure operated member and said rod.

8. As an article of manufacture, a fluid servo-motor unit comprising a casing structure; a pressure differential and spring operated power element housed within said casing structure; a rod operably connected with said element and adapted to be moved therewith to perform work on external mechanism; valve means carried by the motor unit for controlling pressure differential operation of said element; a spring biasing said rod and said element in opposition to said differential pressure operation; solenoid means carried by the motor unit and comprising an armature for controlling operation of said valve means; latch means operable in response to operation of said armature to releasably hold said element independently of said differential pressure in its position of differential pressure operation and against the bias of said spring; switch means carried by said motor unit; and means for effecting an operation of said switch means as an incident to movement of said rod to perform work.

CARL A. NERACHER.
WILLIAM T. DUNN.

REFERENCES CITED

The following references are of record in the file of this patent:

UNITED STATES PATENTS

| Number | Name | Date |
|---|---|---|
| Re. 13,978 | Hulme | Sept. 24, 1915 |
| 720,399 | Brewer | Feb. 10, 1903 |
| 1,069,995 | Anderson | Aug. 12, 1913 |
| 1,078,127 | Coleman | Nov. 11, 1913 |
| 1,131,218 | Dewson et al. | Mar. 9, 1915 |
| 1,169,305 | Turner | Jan. 25, 1916 |
| 1,250,397 | Wallman | Dec. 18, 1917 |
| 1,267,130 | Skeith | May 21, 1918 |
| 1,302,738 | Wallman | May 6, 1919 |
| 1,403,569 | Rogers | Feb. 17, 1922 |
| 1,503,280 | Osbourne | July 29, 1924 |
| 1,515,143 | Candee | Nov. 11, 1924 |
| 1,515,843 | Deville | Nov. 18, 1924 |
| 1,655,896 | Ferguson | Jan. 10, 1928 |
| 1,745,307 | Mason | Jan. 28, 1930 |
| 1,836,813 | Rankin | Dec. 15, 1931 |
| 1,842,798 | Rauen | Jan. 26, 1932 |
| 1,932,649 | Trachsel | Oct. 31, 1933 |
| 1,983,250 | Tibbetts | Dec. 4, 1934 |
| 2,008,231 | Vincent | July 16, 1935 |
| 2,012,377 | Normanville | Aug. 27, 1935 |
| 2,039,186 | Pieper | Apr. 28, 1936 |
| 2,051,553 | Fleischel | Aug. 18, 1936 |
| 2,056,006 | Hodgkins | Sept. 29, 1936 |
| 2,057,491 | Joseph | Oct. 13, 1936 |
| 2,066,873 | Barnes | Jan. 5, 1937 |
| 2,071,165 | Harper | Feb. 16, 1937 |
| 2,078,784 | Willheim | Apr. 27, 1937 |
| 2,097,021 | Normanville | Oct. 26, 1937 |
| 2,118,130 | Aikman | May 24, 1938 |
| 2,119,431 | Gommel | May 31, 1938 |
| 2,120,555 | Good | June 4, 1938 |
| 2,136,971 | Fleischel | Nov. 15, 1938 |
| 2,141,096 | Thurber | Dec. 20, 1938 |
| 2,177,872 | Dunn | Oct. 31, 1939 |
| 2,177,951 | Simpson | Oct. 31, 1939 |
| 2,181,562 | Ganahl | Nov. 28, 1939 |
| 2,183,485 | Butzbach | Dec. 12, 1939 |
| 2,214,099 | Claytor | Sept. 10, 1940 |
| 2,214,100 | Claytor | Sept. 10, 1940 |
| 2,225,493 | Barnes | Dec. 17, 1940 |
| 2,248,851 | Canfield | July 8, 1941 |
| 2,251,464 | Neracher | Aug. 5, 1941 |
| 2,255,020 | Barnes | Sept. 2, 1941 |

FOREIGN PATENTS

| Number | Country | Date |
|---|---|---|
| 21,353 | Great Britain | Oct. 24, 1901 |

OTHER REFERENCES

Automotive Industries, pages 374 and 375, Sept. 24, 1938.